United States Patent [19]

Marumoto et al.

[11] 4,211,961
[45] Jul. 8, 1980

[54] CONTROL CIRCUIT FOR USE IN CONTROL OF CURRENT SUPPLY FOR ELECTRIC MOTOR WITH IMPROVED DUTY CONTROLLING OSCILLATOR CIRCUIT, PARTICULARLY FOR ELECTRICAL VEHICLE

[75] Inventors: Katsuji Marumoto; Tsutomu Omae, both of Hitachi, Japan

[73] Assignee: Hitachi, Ltd., Japan

[21] Appl. No.: 915,582

[22] Filed: Jun. 15, 1978

[30] Foreign Application Priority Data

Jun. 15, 1977 [JP] Japan .................................. 52-69903

[51] Int. Cl.² .............................................. H02P 5/00
[52] U.S. Cl. ..................................... 318/139; 318/341
[58] Field of Search ................................. 318/139, 341

[56] References Cited

U.S. PATENT DOCUMENTS

| | | | |
|---|---|---|---|
| 3,223,909 | 12/1965 | Sensing et al. | 318/139 |
| 3,500,161 | 3/1970 | Domann et al. | 318/341 |
| 3,517,290 | 6/1970 | Gunsser | 318/341 X |
| 3,517,292 | 6/1970 | Thiele | 318/341 |
| 3,597,671 | 8/1971 | Adams | 318/341 X |
| 3,855,520 | 12/1974 | Stich | 318/139 X |
| 3,982,161 | 9/1976 | Grace | 318/341 X |
| 4,066,934 | 1/1978 | Waldorf et al. | 318/139 |
| 4,150,324 | 4/1979 | Naito | 318/139 |

*Primary Examiner*—Gene Z. Rubinson
*Attorney, Agent, or Firm*—Craig & Antonelli

[57] ABSTRACT

A control circuit for controlling supply of current for electric motor has a chopper circuit connected with a battery in series. The chopper circuit is constructed with such as power transistors or power thyristors, and the ON-OFF operation thereof is controlled by a driving pulse. A command signal is produced at a movable tap of a potentiometer, across which a D-C control voltage from the battery is applied. In order to determine the duty and the control frequency of the chopper circuit, a duty controlling oscillator circuit is provided, which generates an output signal on the basis of the command signal from the potentiometer. The duty controlling oscillator circuit includes an integrator composed of an operational amplifier having a negative feedback of a condenser, to the -input terminal of which the command signal is applied. Another operational amplifier having a positive feedback of a resistor operates as a hysteresis comparator, to the +input terminal of which is applied the output from the integrator and to the —one of which a divided reference of the D-C control voltage. In response to the output signal from the hysteresis comparator, a driving pulse generator produces a driving pulse to the chopper circuit.

10 Claims, 10 Drawing Figures

CONTROL CIRCUIT FOR USE IN CONTROL OF CURRENT SUPPLY FOR ELECTRIC MOTOR WITH IMPROVED DUTY CONTROLLING OSCILLATOR CIRCUIT, PARTICULARLY FOR ELECTRICAL VEHICLE

BACKGROUND OF THE INVENTION

The present invention relates to a control circuit for electric motors, such as direct current motors which drive electrical vehicle, such as golf carts, fork lift and the like but may be used for any electrical drive.

The prior art reveals several attempts to provide control circuits for controlling current supply for direct current motors. For example, U.S. Pat. No. 3,517,290 discloses thyristor control circuit, particularly for electrical vehicles, such as small tractors, fork lift trucks. The power circuit of a motor is supplied intermittently with power through a thyristor. Such circuit, however, has drawbacks that the ripple factor of current through the power circuit is not constant. Further, the operability that is the duty (which may also be called ON-OFF ratio or mark-to-space ratio) against the amount of depression of an acceleration pedal, is unstable and can be easily affected by change in the output of battery.

Other prior art which are relevant to the present invention are as follows:

(1) Japanese Patent Laying-open No. 52-64714 (Mar. 28, 1977) "Control Circuit of Thyristor Chopper for Use in Electrical Car"; and (2) U.S. Pat. No. 3,517,292 (June 23, 1970) "Transistor Power Switching Circuit for Pulse Modulation System".

SUMMARY OF THE INVENTION

An object of the present invention is to provide a control circuit for use in control of current supply for a motor in an electrical vehicle, in which the ripple factor is constant and the duty against the depression of the acceleration pedal is not affected by the change in the output of the battery.

The object mentioned above is achieved by a control circuit having a battery for producing an output and a control voltage; a chopper circuit series connected with said battery and for supplying current for the electric motor; means for producing a command signal from dividing the control voltage from said battery; a duty controlling oscillator circuit for generating an output signal on the basis of the command signal from said command signal producing means, by which the duty of the current supplied for the electric motor is determined, and a driving pulse generator for generating a driving pulse in response to the output signal from said duty controlling oscillator circuit, thereby the ON-OFF operation of said chopper circuit being controlled, wherein said duty controlling oscillator circuit comprises an integrator for integrating the command signal from said command signal producing means and a hysteresis comparator for comparing the integrated output from said integrator to a reference produced from dividing the control voltage from said battery.

DETAILED DESCRIPTION OF PREFERRED EMBODIMENTS

Figure 1:
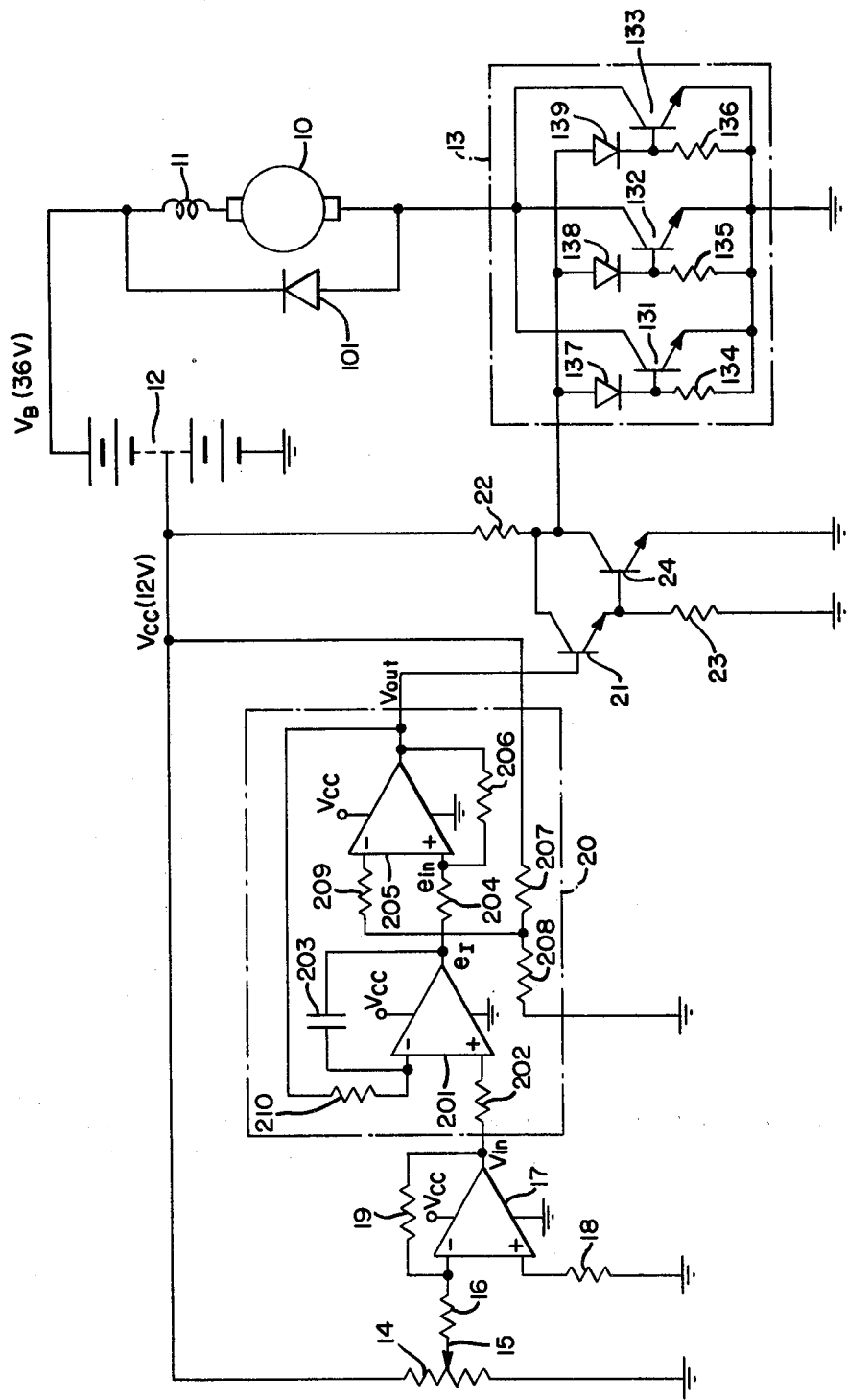
FIG. 1 is a block diagram of the circuit for supplying current for a direct current motor in accordance with the present invention.

Referring now to drawings, wherein like elements are indicated by like reference numerals, and particularly to FIG. 1, a D-C motor 10 of an electric vehicle has a series-connected field winding 11. A battery 12 supplies current to the D-C motor 10 over a current control means 13, such as a chopper circuit including power transistors. As will be explained afterward, it is also possible to use another kind of chopper circuit which is constructed with power thyristors.

The cathode of a freewheel diode 101 is connected to a positive pole of the battery 12 generating a D-C voltage $V_B$ (36 v). The anode of the freewheel diode 101 is connected to a lower side end of the D-C motor 10. The freewheel diode 101 is in parallel connection with the series connection of the D-C motor 10 and the field winding 11. An upper side terminal of the chopper circuit 13 is connected to the lower side end of the D-C motor 10, and a lower side terminal thereof to a negative pole of the battery 12 through ground. When the chopper circuit 13 is blocked, current of the D-C motor 10 can continue to flow through the freewheel diode 101.

A center tap of the battery 12, at which a D-C control voltage Vcc (12 v) is generated, is connected to an upper side end of a potentiometer 14. The D-C control voltage Vcc is prepared for supplying electric power to a control circuit which will be described hereinafter. A lower side end of the potentiometer 14 is connected over an input resistor 16 to an inverting input terminal (−input terminal) of an operational amplifier (OP amplifier) 17. A noninverting input terminal (+input terminal) of the OP amplifier 17 is connected over a resistor 18 to ground. Between an output terminal and the −input terminal of the OP amplifier 17, a feedback resistor 19 is provided for applying negative feedback from the output back to the −input. This OP amplifier 17, therefore, operates as a straight amplifier. Thus, the OP amplifier 17 amplifies a voltage signal appearing at the movable tap 15 of the potentiometer 14, and applies an output signal Vin (which will also be called a command signal) to a duty controlling oscillator circuit 20.

Figure 2:
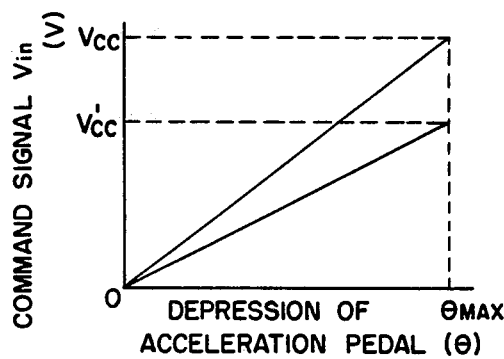
FIGS. 2 and 3 show the output characteristics of an amplifier and a hysteresis comparator shown in FIG. 1.

The movable tap 15 of the potentiometer 14 mechanically cooperates with an acceleration pedal of the electrical vehicle. As is shown in FIG. 2, the amplified signal Vin from the OP amplifier 17, that is the command signal, is in direct proportion to the amount of depression of the acceleration pedal. The inclination of the command signal Vin against the amount of the depression decreases as the D-C control voltage Vcc applied across the potentiometer 14 decreases down to V'cc.

The duty controlling oscillator circuit 20 produces an output signal Vout on the basis of the command signal Vin. The output signal Vout is applied to the base of a transistor 21. The collector of the transistor 21 is connected over a resistor 22 to the center tap of the battery 12 supplying the D-C control voltage Vcc, and the emitter thereof over a resistor 23 to ground. The base of a transistor 24 is connected to the emitter of the transistor 21. The collector and the emitter of the transistor 24 are connected to the collector of the transistor 21 and to ground respectively. These two transistors 21 and 24 form a driving pulse generator, by a driving pulse signal from which the ON-OFF operation of the chopper circuit 13 is controlled.

The chopper circuit 13, as is shown in FIG. 1, includes three power transistors 131, 132 and 133 which are connected in parallel to one another. The collectors of these power transistors 131, 132 and 133 are connected to the lower side end of the D-C motor 10, and the emitter thereof to ground. The bases of the power transistors 131, 132 and 133 are further connected to the cathodes of respective diodes 137, 138 and 139. The anodes of the diodes 137, 138 and 139 are connected to the collector of the transistor 24 at which, as is mentioned above, the driving pulse signal appears. It should be noted that the chopper circuit constructed with four or more power transistors is also applicable in place of the chopper circuit having three power transistors.

Figure 3:
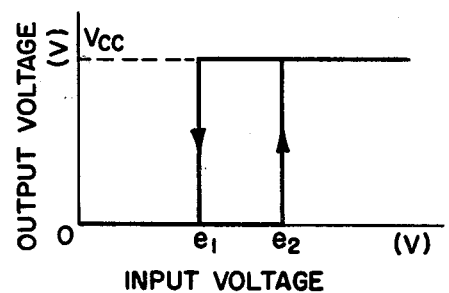

The duty controlling oscillator circuit 20 mentioned above includes an OP amplifier 201. The +input terminal of the OP amplifier 201 is connected through an input resistor 202 to the output terminal of the OP amplifier 16 producing the command signal Vin. The OP amplifier 201 has a feedback condenser 203 being connected between the output terminal and the −input terminal thereof, thereby operating as an integrator. The output $e_I$ from the OP amplifier 201 is applied over an input resistor 204 to the +input terminal of an OP amplifier 205. The OP amplifier 205 has a feedback resistor 206 connected between the output terminal and the +input terminal thereof. As is well known in the art, this positive feedback applied from the output back to the +input of the OP amplifier 205 converts the straight amplifier comparator into a hysteresis comparator or Schimidt trigger. The hysteresis characteristics of the OP amplifier 205 is illustrated in FIG. 3. The −input of the OP amplifier 205 is provided with a reference voltage divided by series-connected resistors 207 and 208, the junction of which is connected over a resistor 209 to the −input terminal. The D-C control voltage Vcc is applied across the series-connected resistors 207 and 208. The output signal Vout appears at the output terminal of the OP amplifier 205, and is simultaneously fed over a resistor 210 back to the −input terminal of the OP amplifier 201.

The operation of the above-mentioned electric circuitry of the electric vehicle in accordance with the present invention will be given by making reference to FIGS. 1, 2, 3 and 4(a) and (b) hereinafter.

The OP amplifier 17 amplifies the input voltage at the movable tap 15 of the potentiometer 14, and to produce the command signal Vin which is, as is illustrated in FIG. 2, in direct proportion to the depression of the acceleration pedal.

Figure 4:
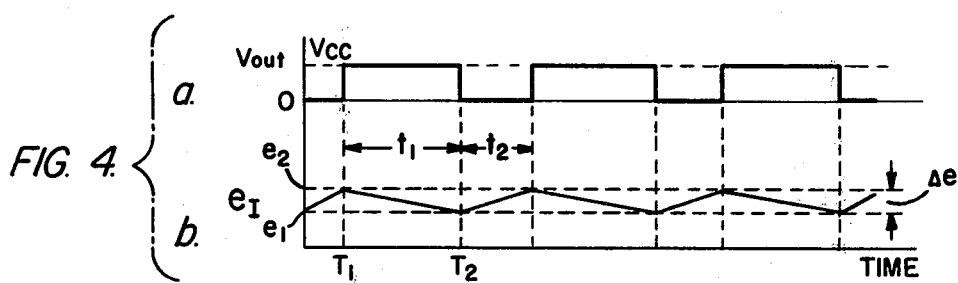
FIGS. 4(a) and (b) show the waveforms of the signals in a duty controlling oscillator circuit shown in FIG. 1.

The OP amplifier 201 of the duty controlling oscillator circuit 20, which operates as the integrator, produces the output $e_I$. The output $e_I$, which is shown in FIG. 4(b), can be described by a following equation;

$$e_I = -\frac{1}{R_1C} \int (V\text{out} - V\text{in}) dt \qquad (1)$$
$$= -\frac{1}{R_1C} \cdot (V\text{out} - V\text{in}) \cdot t$$

wherein $R_1$ is the resistance value of the resistor 210, C the capacitance of the condenser 203 and t time.

When the output signal Vout is at zero (0 v), the equation (1) becomes as follows:

$$e_I = -\frac{1}{R_1C} \cdot (-V\text{in}) \cdot t = \frac{V\text{in}}{R_1C} t \qquad (2)$$

As in shown in FIG. 4(b), the output $e_I$ increases as time passes.

At the moment $T_1$ when the output $e_I$ reaches to be equal to $e_2$, i.e. one of threshold levels of the hysteresis comparator composed of the OP amplifier 205, there exists following relation between the voltage $e_{in}$ at the −input terminal of the OP amplifier 205 and the output signal $V_{out}$ at the output terminal thereof;

$$e_{in} = e_2 - \frac{R_2}{R_2 + R_3}(e_2 - 0) = V\text{out} \qquad (3)$$

wherein $R_2$ and $R_3$ represent the resistance values of the resistors 204 and 205 respectively.

Then, the output signal Vout changes from 0 (v) to Vcc, as is shown in FIG. 4(a).

When the output signal Vout is at Vcc, the output $e_I$ at the output terminal of the integrator of the OP amplifier 201 is described as follows;

$$e_I = -\frac{1}{R_1C} \cdot (V cc - V\text{in}) \cdot t = \frac{V\text{in} - V cc}{R_1C} t \qquad (4)$$

The output $e_I$ decreases as the time passes, because the D-C control voltage Vcc is greater than the command signal Vin.

At the moment $T_2$ when the output $e_I$ becomes to be equal to $e_1$, i.e. the other threshold level of the hysteresis comparator, relationship between the input voltage $e_{in}$ and the output signal Vout is as follows:

$$e_{in} = e_1 - \frac{R_2}{R_2 + R_3}(e_1 - V cc) = V\text{out} \qquad (5)$$

Then, the OP amplifier 205 turns its output signal Vout from Vcc to 0 (v). Up to the moment $T_3$, the output signal Vout contains the voltage Vcc, and the output $e_I$ increases as time passes again.

The transistors 21 and 24 supply the driving pulse signals to the bases of the power transistors 131, 132 and 133 of the chopper circuit 13 and control the ON-OFF operation thereof.

The duty, that is the ratio of ON-time to the sum of ON-time and OFF-time, which may also be called ON-OFF ratio or mark-to-space, is determined by the output signal Vout from the duty controlling oxcillator circuit 20. From the equation (4), the ON-time, that is the period $t_1$ from $T_1$ to $T_2$, can be described by a following equation;

$$t_1 = \frac{R_1 C}{V_{cc} - V_{in}} (e_2 - e_1) = \frac{R_1 C}{V_{cc} - V_{in}} \Delta e \quad (6)$$

wherein
e is equal to $e_2-e_1$.

On the other hand, the OFF-time ($t_2$) from $T_2$ to $T_3$, can be obtained from the equation (2) as follows;

$$t_2 = \frac{R_1 C}{V_{in}} (e_2 - e_1) = \frac{R_1 C}{V_{in}} \Delta e \quad (7)$$

From the above two equations (6) and (7), the duty $\delta$ and the control frequency f are as follows:

$$\delta = \frac{t_1}{t_1 + t_2} = \frac{R_1 C \Delta e/(V_{cc} - V_{in})}{R_1 C \Delta e/(V_{cc} - V_{in}) + R_1 C \Delta e/V_{in}} \quad (8)$$
$$= \frac{V_{in}}{V_{cc}}$$

$$f = \frac{1}{t_1 + t_2} = \frac{1}{R_1 C \Delta e/(V_{cc} - V_{in}) + R_1 C \Delta e/V_{in}} \quad (9)$$
$$= \frac{V_{in}(V_{cc} - V_{in})}{\Delta e} = \frac{V_{in}}{V_{cc}} \cdot \frac{1}{\Delta e} \cdot V_{cc}(1 - \frac{V_{in}}{V_{cc}})$$

Putting the $\delta$ of the equation (8) into the equation (9), following relationship can be obtained.

$$f = \frac{V_{cc}}{\Delta e} \delta(1 - \delta) \quad (10)$$

Figure 5:
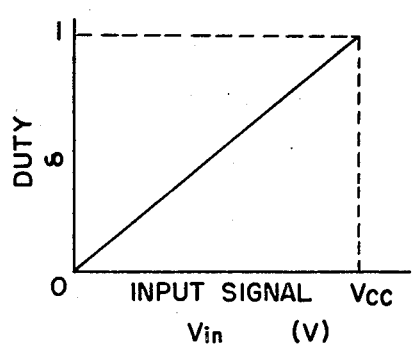
FIGS. 5 and 6 show the duty and the control frequency characteristics achieved by the circuit shown in FIG. 1.
Figure 6:
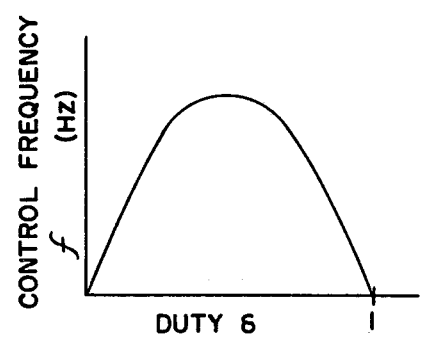

The relationships between the command signal $V_{in}$ and the duty $\delta$ and between the duty $\delta$ and the control frequency f are illustrated in FIGS. 5 and 6 respectively.

The above-mentioned circuitry has advantage that the duty $\delta$ and the control frequency f are precisely determined by the amount of depression $\theta$ of the acceleration pedal, which cooperates with the movable tab 15 of the potentiometer 14. Thus, they are scarcely ever affected with the output voltage change of the battery 12. The reason of this will be given hereinafter.

As is mentioned previously, since the command signal $V_{in}$ is obtained from dividing the D-C control voltage $V_{cc}$ by the potentiometer 14, it can be described by a following equation;

$$V_{in} = \frac{Rb}{Ra + Rb} V_{cc} \quad (12)$$

wherein Ra is the resistance value of the upper portion of the potentiometer 14 devided by the movable tap 15, and Rb that of the lower portion thereof.

Putting the command signal $V_{in}$ obtained from the equation (12) into the equation (8), the duty $\delta$ becomes as follows:

$$\delta = \frac{V_{in}}{V_{cc}} = \frac{Rb \cdot V_{cc}}{(Ra + Rb) \cdot V_{cc}} = \frac{Rb}{Ra + Rb} \quad (13)$$

This equation means that the duty $\delta$ of the chopper circuit 13 is determined by the ratio of the resistances of the potentiometer 14 divided by the movable tap 15 which cooperates with the acceleration pedal. Thus, the duty $\delta$ is precisely determined in direct proportion to the amount of the depression of the acceleration pedal of the electric vehicle even if the D-C control voltage $V_{cc}$ deviates.

On the other hand, from the equations (3) and (5), the voltages $e_1$ and $e_2$ are obtained as follows:

$$e_1 = \frac{R_2 + R_3}{R_3} (V_{out} - \frac{R_2}{R_2 + R_3} V_{cc}) \quad (14)$$

$$e_2 = \frac{R_2 + R_3}{R_3} V_{out} \quad (15)$$

Therefore, $\Delta$ e is described by a following equation:

$$\Delta e = e_2 - e_1 = \frac{R_2}{R_3} V_{cc} \quad (16)$$

Putting into the equation (10) the voltage difference $\Delta$ e of the above equation (16), the control frequency f becomes as follows:

$$f = \frac{V_{cc}}{(R_2/R_3) \cdot V_{cc}} \cdot \delta(1 - \delta) = \frac{R_3}{R_2} \cdot \delta(1 - \delta) \quad (17)$$

Further, putting into the above equation (17) the duty $\delta$ of the equation (13), the control frequency f becomes as follows:

$$f = \frac{R_3}{R_2} \left(\frac{Rb}{Ra + Rb}\right) \left(1 - \frac{Rb}{Ra + Rb}\right) \quad (18)$$
$$= \frac{R_3 \cdot Ra \cdot Rb}{R_2 \cdot (Ra + Rb)}$$

As is apparent from the above equation (18), the control frequency f of the chopper circuit 13 is determined by the resistors 204 and 205 and the resistance ratio of the potentiometer 14. Therefore the control frequency f is also hardly even affected with the output voltage change of the battery 12, but determined by the amount of the depression $\theta$ of the acceleration pedal.

Further, assuming that the ripple factor of current flowing through the D-C motor 10 is $\mu$, it can be obtained by a following equation;

$$\mu = \frac{i \max - i \min}{I_M} = \frac{V_B \delta(1 - \delta)}{L \cdot I_M \cdot f} \quad (19)$$

wherein i max and i min represent a maximum and a minimum motor currents respectively, $I_M$ an average motor current, $V_B$ the output voltage from the battery 12 and L the sum of the reactance of the D-C motor 10, the field winding 11 and the power circuit as a whole.

Putting the control frequency f of the equation (17) into the equation (19), the ripple factor $\mu$ becomes as follows:

$$\mu = \frac{V_B \delta(1 - \delta)}{L \cdot I_M \cdot \frac{R_3}{R_2} \cdot \delta(1 - \delta)} = \frac{V_B \cdot R_2}{L \cdot I_M \cdot R_3} \quad (20)$$

As is apparent from the above equation (20), the ripple factor $\mu$ is determined at constant value irrespective of the duty $\delta$ of the chopper circuit 13.

Figure 7:
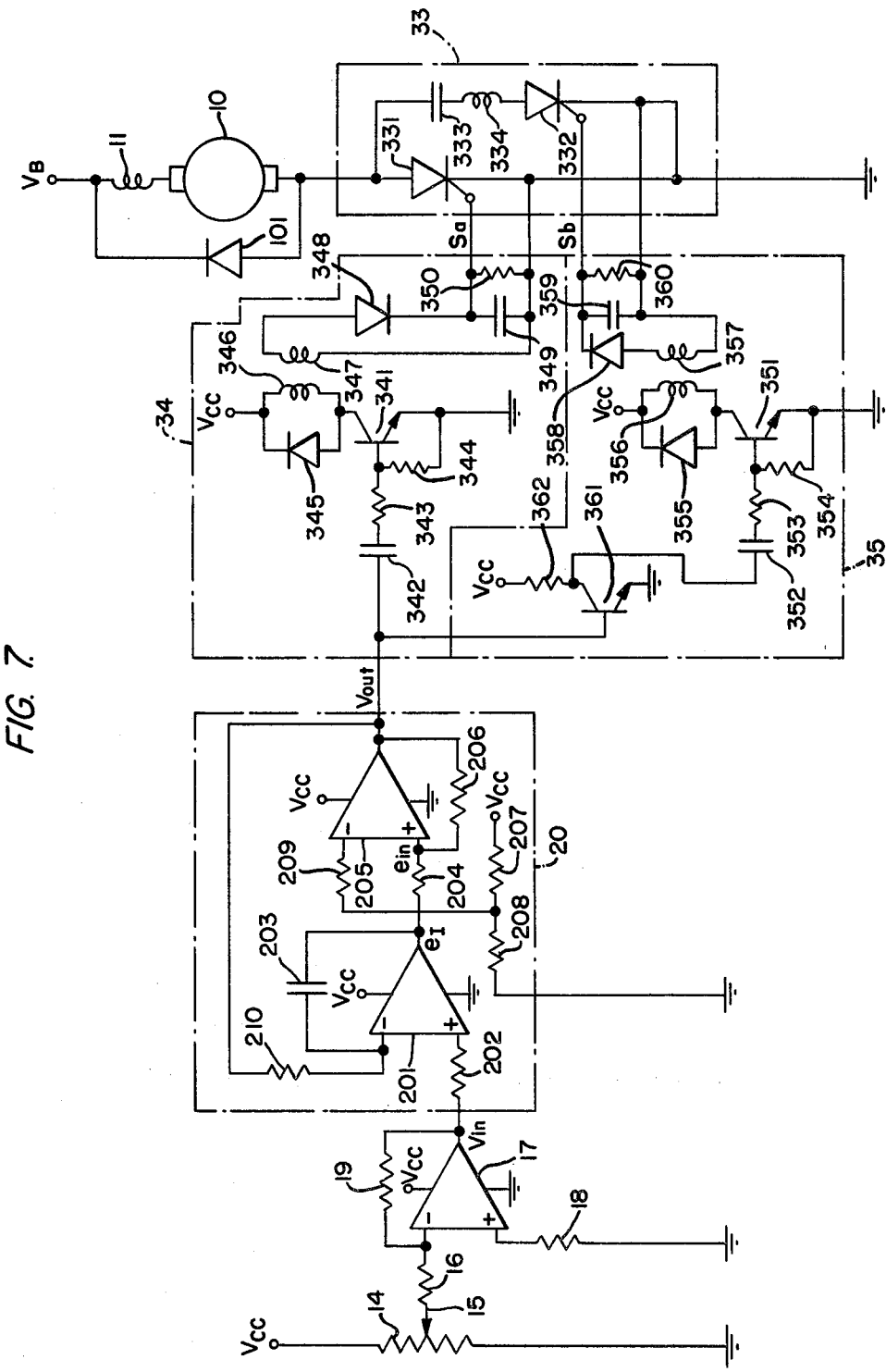
FIG. 7 is a block diagram of another embodiment employing thyristors in accordance with the present invention.

Referring to FIG. 7, wherein parts already described in connection with FIG. 1 will not be described again and similar parts have like reference numerals, the battery (not shown) supplies current to the D-C motor 10 including the series-connected field winding 11 and the freewheel diode 101 over an another kind of chopper circuit 33 which is constructed with power thyristors.

The ON-OFF operation of the chopper circuit 33 is controlled by triggering pulses which are generated by pulse generators 34 and 35 in response to the output Vout from the duty controlling oscillator circuit 20.

The thyristor chopper circuit 33 has a first thyristor 331. The anode of the thyristor 331 is connected to the lower side end of the D-C motor 10 and the cathode thereof to ground.

In order to extinguish the first thyristor 331, a second thyristor 332 is provided. The anode of the second thyristor 332 is connected over the series connection of a condenser 333 and a coil 334 to the anode of the first thyristor 331, and the cathode thereof to that of the thyristor 131.

The pulse generator 34 has a transistor 341, to the base of which the output signal Vout from the duty controlling oscillator circuit 20 is applied over the series connection of a condenser 342 and a resistor 343. The series connection of the condenser 342 and the register is provided for forming a pulse signal in response to rising of the output signal Vout. A resistor 344 is connected between the base and the emitter of the transistor 341. The collector of the transistor 341 is connected over the parallel connection of a diode 345 and a transformer 346 to the D-C control voltage source Vcc. The transformer 346 is magnetically connected to a transformer 347. The transformer 347 is connected between the gate and the anode of the first thyristor 341 through a diode 348. A parallel connection of a condenser 349 and a resistor 350 is also connected between the gate and the cathode of the first thyristor 331 in parallel to the transformer 347.

The pulse generator 35, as is illustrated in FIG. 7, has like components, that is a transistor 351, a series connection of a condenser 352 and a resistor 353, a resistor 354, a diode 355, transformers 356 and 357, a diode 358 and a parallel connection of a condenser 359 and a resistor 360, which are constructed in a similar manner to that of the pulse generator 34. Further in order to invert the polarity of the output signal Vout from the duty controlling oscillator circuit 20, a transistor 361 is provided, the base of which is connected to the output terminal thereof. The emitter of the transistor 360 is connected to ground and the collector thereof to the base of the transistor 351 over the series connection of the condenser 352 and the resistor 353. The collector of the transistor 361 is further connected over a resistor 361 to the D-C control voltage Vcc.

Figure 8:
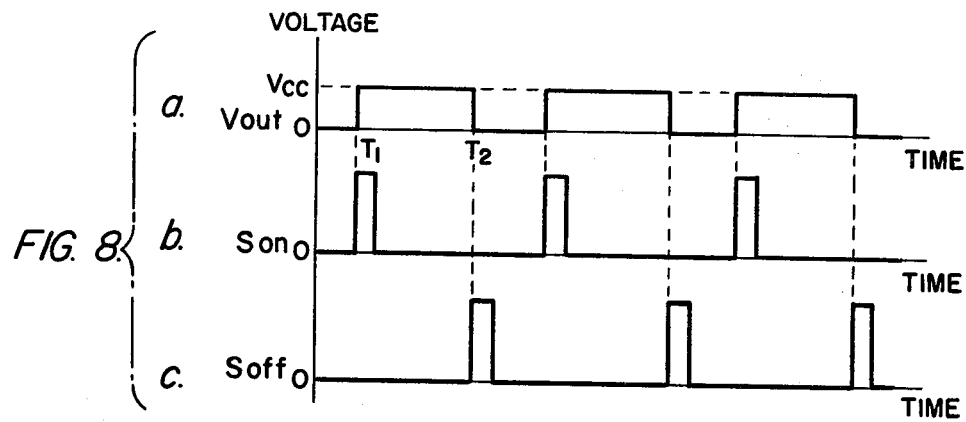
FIG. 8 shows the waveforms of the signals at various points of the circuit shown in FIG. 7.

The operation of the circuitry shown in FIG. 7, particularly of the pulse generators 34 and 35, will be given by making reference to FIG. 8 hereinafter. When the output signal Vout from the duty controlling oscillator circuit 20 rises from 0 (v) up to Vcc (at $T_1$), a pulse signal is formed by the function of the series connection of the condenser 342 and the resistor 343, and is applied to the base of the transistor 341. During the pulse width of the pulse signal, the transistor 341 is in conductive state, and abrupt current flows, partially through the diode 345, through the transformer 346. In response to the current intermittently flowing through the transformer 346, a triggering pulse Son, that is an ON-pulse for the thyristor chopper 33, which is shown in FIG. 8(a) appears across the transformer 347.

On the other hand in the pulse generator 35, the output signal Vout is inverted in the polarity by the function of the transistor 360. Hence, the pulse signal applied to the base of the transistor 351 is formed when the output signal Vout falls from Vcc down to 0 (v) (at $T_2$).

The triggering pulse S off, that is an OFF-pulse for the thyristor chopper 33, which is shown in FIG. 8(b) is produced in a similar way to the triggering pulse Sa.

Figure 9:
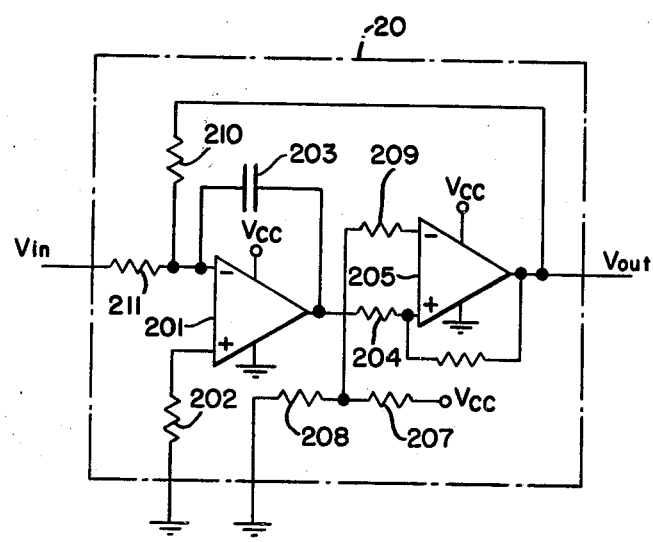
FIG. 9 shows the duty controlling oscillating circuit of another construction, which is also applicable for the circuits shown in FIGS. 1 and 7.

In FIG. 9, there is shown the duty controlling oscillator circuit 20, in which the input signal Vin is applyed over a resistor 211 to the −input terminal of the OP amplifier 201 and the +input terminal thereof over the resistor 202 to ground. This circuitry can be employed as the duty controlling oscillator circuit in the embodiments shown in FIGS. 1 and 7.

What we claim:

1. A control circuit for controlling supply of current for an electric motor, having a battery for producing an output and a control voltage; a chopper circuit series connected with said battery and for supplying current for the electric motor; means for producing a command signal from dividing the control voltage from said battery; a duty controlling oscillator circuit for generating an output signal on the basis of the command signal from said command signal producing means, by which the duty of the current supplied for the electric motor is determined, and a driving pulse generator for generating a driving pulse in response to the output signal from said duty controlling oscillator circuit, thereby the ON-OFF operation of said chopper circuit being controlled, wherein said duty controlling oscillator circuit comprises an integrator for integrating the command signal from said command signal producing means, a hysteresis comparator for comparing the integrated output from said integrator to a reference produced from dividing the control voltage from said battery and a feedback provided between the output of said hysteresis comparator and the input of said integrator.

2. A control circuit as claimed in claim 1, wherein said integrator is constructed with an operational amplifier having a negative capacitive feedback, to one of input terminals thereof the command signal being applied.

3. A control circuit as claimed in claim 1, wherein said command signal producing means comprises a potentiometer across which the control voltage from said battery is applied, and the command signal appears at the movable tap of said potentiometer.

4. A control circuit as claimed in claim 1, wherein said hysteresis comparator is constructed with an operational amplifier having a positive resistance feedback, the inverting input terminal thereof the reference being applied to, and the noninverting input terminal thereof being connected to the output terminal of said integrator.

5. A control circuit as claimed in claim 1, wherein the reference applied to said hysteresis comparator is produced by a series connection of resistors across which the control voltage is applied, the reference appearing at the junction thereof.

6. A control circuit as claimed in claim 1, wherein said chopper circuit is constructed with power transistors.

7. A control circuit as claimed in claim 1, wherein said chopper circuit is constructed with power thyristors.

8. A control circuit as claimed in claim 7, wherein said driving pulse generator comprises two triggering pulse generators, one of which generates an ON-pulse and the other of which generates an OFF pulse.

9. A control circuit for controlling supply of current for an electric motor, comprising:

a battery for producing an output and a control voltage;

a transistor chopper circuit series connected with said battery and for supplying current for the electric motor;

a potentiometer across which the control voltage from said battery is applied, and having a movable tap at which a voltage appears;

a straight amplifier for amplifying and producing a command signal on the basis of the voltage at the movable tap of said potentiometer;

a first operational amplifier having a negative capacitive feedback, to a noninverting input terminal of which the command signal is applied;

a second operational amplifier having a positive resistance feedback, to a noninverting input terminal of which is applied the command signal, and producing an output signal at an output terminal thereof;

a series connection of resistors across which the control voltage is applied, and the junction thereof being connected to an inverting input terminal of said second amplifier for applying a reference thereto;

a feedback provided between the output terminal of said second operational amplifier and the inverting input terminal of said first operational amplifier;

a driving pulse generator for generating a driving pulse in response to the output signal from said second operational amplifier to said transistor chopper circuit, thereby the ON-OFF operation of said transistor chopper circuit being controlled.

10. A control circuit for controlling supply of current for an electric motor, comprising; and a battery for producing an output and a control voltage;

a thyristor chopper circuit series connected with said battery and for supplying current for the electric motor;

a potentiometer across which the control voltage from said battery is applied, and having a movable tap at which a voltage appears;

a straight amplifier for amplifying and producing a command signal on the basis of the voltage at the movable tap of said potentiometer;

a first operational amplifier having a negative capacitive feedback, to a noninverting input terminal of which the command signal is applied;

a second operational amplifier having a positive resistance feedback, to a noninverting input terminal of which is applied the command signal, and producing an output signal at an output terminal thereof;

a series connection of resistors across which the control voltage is applied, and the junction thereof being connected to an inverting input terminal of said second amplifier for applying a reference thereto;

a feedback provided between the output terminal of said second operational amplifier and the inverting input terminal of said first operational amplifier;

a driving pulse generator including a first triggering pulse generator for producing an ON-pulse to said thyristor chopper circuit and a second triggering pulse generator for producing an OFF-pulse thereto, in response to the output signal from said second operational amplifier, thereby the ON-OFF operation of said chopper circuit being controlled.

* * * * *